No. 711,735. Patented Oct. 21, 1902.
R. RISER.
EYEGLASSES.
(Application filed Nov. 26, 1900.)
(No Model.)
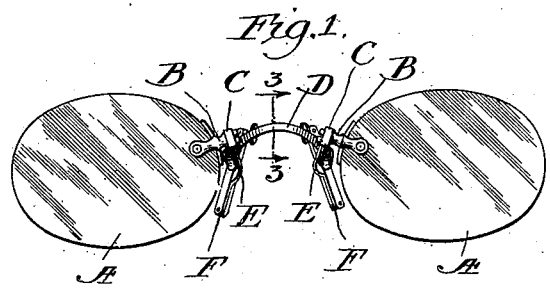
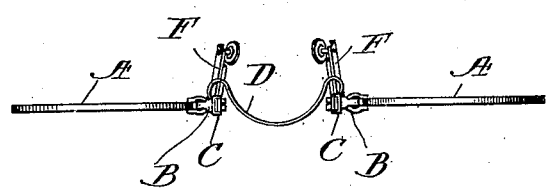
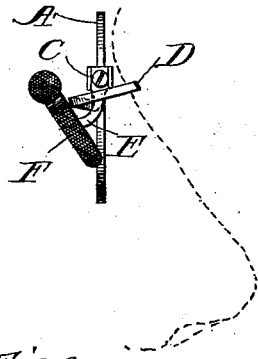
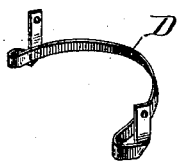
Witnesses
Edw. P. Barrett.
Bertha C. Sims.
Inventor
Rudolph Riser
By L. W. Hopkins
Atty.

UNITED STATES PATENT OFFICE.

RUDOLPH RISER, OF CHICAGO, ILLINOIS.

EYEGLASSES.

SPECIFICATION forming part of Letters Patent No. 711,735, dated October 21, 1902.

Application filed November 26, 1900. Serial No. 37,765. (No model.)

*To all whom it may concern:*

Be it known that I, RUDOLPH RISER, a subject of the King of Sweden and Norway, residing at Chicago, in the county of Cook and State of Illinois, have invented certain new and useful Improvements in Eyeglasses, of which the following is a specification.

The present invention relates to that class of eyeglasses in which the bow-spring resembles the saddle-bridge of a pair of spectacles in that it has a saddle which conforms more or less closely to the bridge of the nose, but may or may not have direct contact therewith.

The object of the invention, broadly stated, is to provide an improved bow-spring for eyeglasses of this class, to the ends, first, that the distance apart of the lenses or the posts, through the medium of which the ends of the spring are attached to the lenses, may be adjusted without affecting the shape of the intermediate portion or saddle of the spring; second, that the spring may be made of sufficient length to give it the necessary elasticity regardless of the distance apart of the lenses or the posts; third, that boxes or other attaching devices of special construction shall not be necessary; fourth, that offset guards may be used and when used may be adjusted without affecting the shape of the bow-spring or disturbing the adjustment of the lenses with respect to each other, and, fifth, that the glasses as a whole shall be neat, compact, and ornamental.

To these ends the invention consists in the features of novelty that are herein described, and in order that it may be fully understood I will describe it with reference to the accompanying drawings, which are made a part of this specification, and in which—

Figure 1 is a front elevation of a pair of eyeglasses embodying the invention. Fig. 2 is a plan view thereof. Fig. 3 is a section thereof on the line 3 3, Figs. 1 and 2. Fig. 4 is a perspective view of the bow-spring.

A represents the lenses, B the posts, and C the boxes, all of which may be of any desired construction so long as the boxes are open at bottom for admitting the ends of the bow-spring D and the ends of the shanks or stems E of the offset guards. The intermediate portion of the bow-spring, herein called the "saddle," is shaped to conform more or less closely to the bridge of the nose and may or may not have direct contact therewith, and thereby aid in supporting the glasses. The saddle is disposed in whatever plane may be necessary in order to bring it to a position approximately at right angles to the bridge of the nose, and this will generally be a plane forming angles with the plane of the lenses and a plane perpendicular to said plane of the lenses. As shown in the drawings, the saddle extends both forward and backward from the plane of the lenses, and its intermediate portion spans the space between the boxes; but it will be understood that its shape in these respects may be altered to meet the requirements of individual cases without departing from the spirit of the invention. The novelty in the bow-spring resides in the shape which is given it between its extremities and the ends of the saddle. Proceeding from each end of the saddle the spring takes a course which is first outward or toward the lenses, thence forward, thence inward, and thence upward, the portion between the forwardly and upwardly projecting portions being twisted, so that said forwardly and upwardly projecting portions lie approximately at right angles to each other and the upwardly-projecting portion enters the bottom of the box, the end being perforated for the passage of the customary fastening-screw. This construction enables the lenses to be adjusted, so as to bring them to the desired distance apart by bending those portions of the spring which are beyond the extremities of the saddle, and this may be done without affecting the shape of the saddle proper. The stems or shanks E of the pads cross the ends of the saddle and proceed downward and rearward far enough to bring the pads F beyond the extremities of the saddle, so that the guards may be adjusted independently of the bow-spring.

What I claim as new, and desire to secure by Letters Patent, is—

1. As a new article of manufacture, a bow-spring for eyeglasses made of a narrow strip or ribbon of spring metal elastic throughout and having a saddle shaped to conform more or less closely to and adapted to rest upon the bridge of the nose, and having beyond the extremities of the saddle, portions which extend forward and portions extending upward, the strip being given half-turns between the portions extending forward and the portions extending upward, substantially as set forth.

2. As a new article of manufacture, a bow-spring for eyeglasses made of a narrow strip or ribbon of spring metal elastic throughout and having a saddle shaped to conform more or less closely to and adapted to rest upon the bridge of the nose and having beyond the extremities of the saddle, portions which extend outward and, beyond these, portions which extend forward and, beyond these, portions which extend upward, the strip being given half-turns between the portions extending forward and the portions extending upward, substantially as set forth.

3. As a new article of manufacture, a bow-spring for eyeglasses elastic throughout and having a saddle shaped to conform more or less closely to and adapted to rest upon the bridge of the nose and having beyond the extremities of the saddle, portions which extend forward and, beyond these, portions which extend inward, and, beyond these, portions which extend upward, the inwardly-extending portion being twisted, substantially as set forth.

4. As a new article of manufacture, a bow-spring for eyeglasses elastic throughout and having a saddle shaped to conform more or less closely to and adapted to rest upon the bridge of the nose and having beyond the extremities of said saddle, portions which extend first outward, thence forward, thence inward and thence upward, the inwardly-projecting portion being twisted, substantially as set forth.

RUDOLPH RISER.

Witnesses:
L. M. HOPKINS,
BERTHA C. SIMS.